(12) United States Patent
Gronbach

(10) Patent No.: US 7,075,695 B2
(45) Date of Patent: Jul. 11, 2006

(54) METHOD AND APPARATUS FOR CONTROLLING A BIAS VOLTAGE OF A MACH-ZEHNDER MODULATOR

(75) Inventor: Siegfried Gronbach, Bubenreuth (DE)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 10/790,620

(22) Filed: Mar. 1, 2004

(65) Prior Publication Data
US 2005/0190428 A1  Sep. 1, 2005

(51) Int. Cl.
G02F 1/03 (2006.01)
G02F 1/07 (2006.01)

(52) U.S. Cl. .................. 359/245; 359/246; 359/240

(58) Field of Classification Search .......... 359/245
See application file for complete search history.

(56) References Cited

U.S. PATENT DOCUMENTS

| | | | |
|---|---|---|---|
| 6,014,241 A | 1/2000 | Winter et al. | 359/245 |
| 6,426,822 B1 | 7/2002 | Winter et al. | 359/187 |
| 6,647,040 B1 | 11/2003 | Dietrich et al. | 372/38.01 |
| 6,871,084 B1* | 3/2005 | Kingsley et al. | 600/372 |
| 2002/0114047 A1* | 8/2002 | McBrien et al. | 359/180 |
| 2003/0002118 A1 | 1/2003 | Givehchi | 398/183 |
| 2003/0112487 A1 | 6/2003 | Fuller | 359/239 |
| 2003/0223462 A1* | 12/2003 | Fu et al. | 370/500 |
| 2004/0008395 A1 | 1/2004 | McBrien et al. | 359/238 |
| 2005/0117191 A1* | 6/2005 | Griffin | 359/245 |

FOREIGN PATENT DOCUMENTS

| | | |
|---|---|---|
| EP | 05 25 0876 | 5/2005 |
| FR | 2 830 088 A | 3/2003 |

\* cited by examiner

Primary Examiner—Jordan M. Schwartz
Assistant Examiner—Jessica Stultz

(57) ABSTRACT

A method and apparatus for controlling a bias voltage of a Mach-Zehnder modulator (MZM) use a digital pilot signal and a digital correlation technique to produce a feedback signal for adjusting the bias voltage to the quadrature bias point. Embodiments of the invention include apparatuses performing a non-return-to-zero (NRZ), return-to-zero (RZ), or carrier suppressed RZ (CSRZ) high-speed optical modulation.

10 Claims, 5 Drawing Sheets

METHOD AND APPARATUS FOR CONTROLLING A BIAS VOLTAGE OF A MACH-ZEHNDER MODULATOR

FIELD OF THE INVENTION

The present invention generally relates to the field of high-speed optical communications and, more specifically, to high-speed optical modulators.

BACKGROUND OF THE INVENTION

In high-speed optical communications, electro-optical modulators are used to modulate a continuous wave (CW) laser output into light pulses that transmit voice, data, and/or video signals over fiber-optic cables. One such modulator is a Mach-Zehnder modulator (MZM). The MZM has a sinusoidal transfer function of modulating voltage in relation to the light output. To operate the MZM in a linear mode providing best optical transmission performance, a DC bias voltage is applied across modulating electrodes of the modulator. Generally, a bias point must be maintained at the point of inflection (i.e., quadrature) of the sinusoidal transfer function. However, the bias point is subject to a drift due to factors such as temperature variations, optical stress, aging of the modulator, and the like. As the bias moves away from the quadrature bias point, the MZM may cause significant intermodulation distortion in the transmitted signal. Therefore, in operation, the bias point should be dynamically controlled.

An established method for controlling the bias voltage of the MZM is based on modulating the bias voltage with an analog (e.g., sinusoidal) pilot tone, detecting a portion of the output optical signal, and detecting a harmonic of the pilot tone using a synchronous detector. The detected pilot tone is then used for generating a feedback signal that adjusts a bias circuit such that MZM operates at a pre-selected bias point. However, this method provides low accuracy near the bias point where the feedback signal is small and excessively sensitive to spurious noise components in the detected pilot tone. These drawbacks result in non-optimal value and instability of the bias voltage of the MZM.

Therefore, there is a need in the art for an improved method and apparatus for controlling a bias voltage of Mach-Zehnder modulators used in high-speed optical communications.

SUMMARY OF THE INVENTION

The present invention is generally a method and apparatus for controlling a bias voltage of a Mach-Zehnder modulator (MZM) used for performing a non-return-to-zero (NRZ), return-to-zero (RZ), or carrier suppressed RZ (CSRZ) high-speed modulation (e.g., 10–40 Gbit/s or higher) of an optical signal.

In one embodiment of the present invention, a method for controlling the bias voltage of a MZM performing the NRZ modulation includes generating a digital pilot signal, modulating the MZM using the digital pilot signal, detecting a portion of an optical output signal from the MZM using a light detector, and processing an output signal of the light detector using a digital correlation filter and a digital demodulator to produce a feedback signal controlling the bias voltage of the MZM.

In another embodiment of the present invention, a method for controlling the bias voltages of an input MZM and an output MZM coupled for performing an RZ or CSRZ modulation includes generating a digital pilot signal, modulating sequentially the input MZM or the output MZM using the digital pilot signal, detecting a portion of an optical output signal from the MZM using a light detector, and processing an output signal of the light detector using a digital correlation filter and a digital demodulator to produce a feedback signal controlling a bias voltage of an MZM which is modulated, during at least a data sampling period of the processing step, using the digital pilot signal.

In still another embodiment of the present invention, an apparatus for controlling a bias voltage of a MZM performing an NRZ modulation includes a generator of a digital pilot signal modulating the MZM, a bias circuit generating a bias voltage for the MZM, a light detector detecting a portion of an optical signal from the MZM, and a digital signal processor processing an output signal of the light detector and coupled to a control input of the bias circuit.

In yet another embodiment of the present invention, an apparatus for controlling a bias voltage of an input MZM and an output MZM coupled for performing an RZ or CSRZ modulation of an optical signal includes a generator of a digital pilot signal for modulating the input MZM and the output MZM, a first bias circuit of the input MZM, a second bias circuit of the output MZM, a light detector of a portion of an optical output signal from the output MZM, a digital signal processor processing an output signal of the light detector, and a time multiplexing circuit comprising a timing circuit controlling a first multiplexer and a second multiplexer, wherein the first multiplexer sequentially couples the digital pilot signal to the input MZM or the output MZM and the second multiplexer couples an output of the digital signal processor to a control input of the bias circuit of the MZM concurrently coupled to the digital pilot signal.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

It is to be noted, however, that the appended drawings illustrate only exemplary embodiments of this invention and are therefore not to be considered limiting of its scope, for the invention may admit to other equally effective embodiments.

DETAILED DESCRIPTION OF THE INVENTION

The present invention advantageously provides high accuracy control of an optimal bias voltage for Mach-Zehnder modulators (MZMs) used for performing non-return-to-zero (NRZ), return-to-zero (RZ), or carrier suppressed RZ (CSRZ) high-speed modulation (e.g., 10–40 Gbit/s or higher) of a continuous wave (CW) optical signal. The invention employs a digital pilot tone in conjunction with a digital signal processing scheme that suppresses spurious noise components in the pilot tone and increases signal to noise (S/N) ratio of the feedback signal controlling the bias voltage of the MZM.

Figure 1:
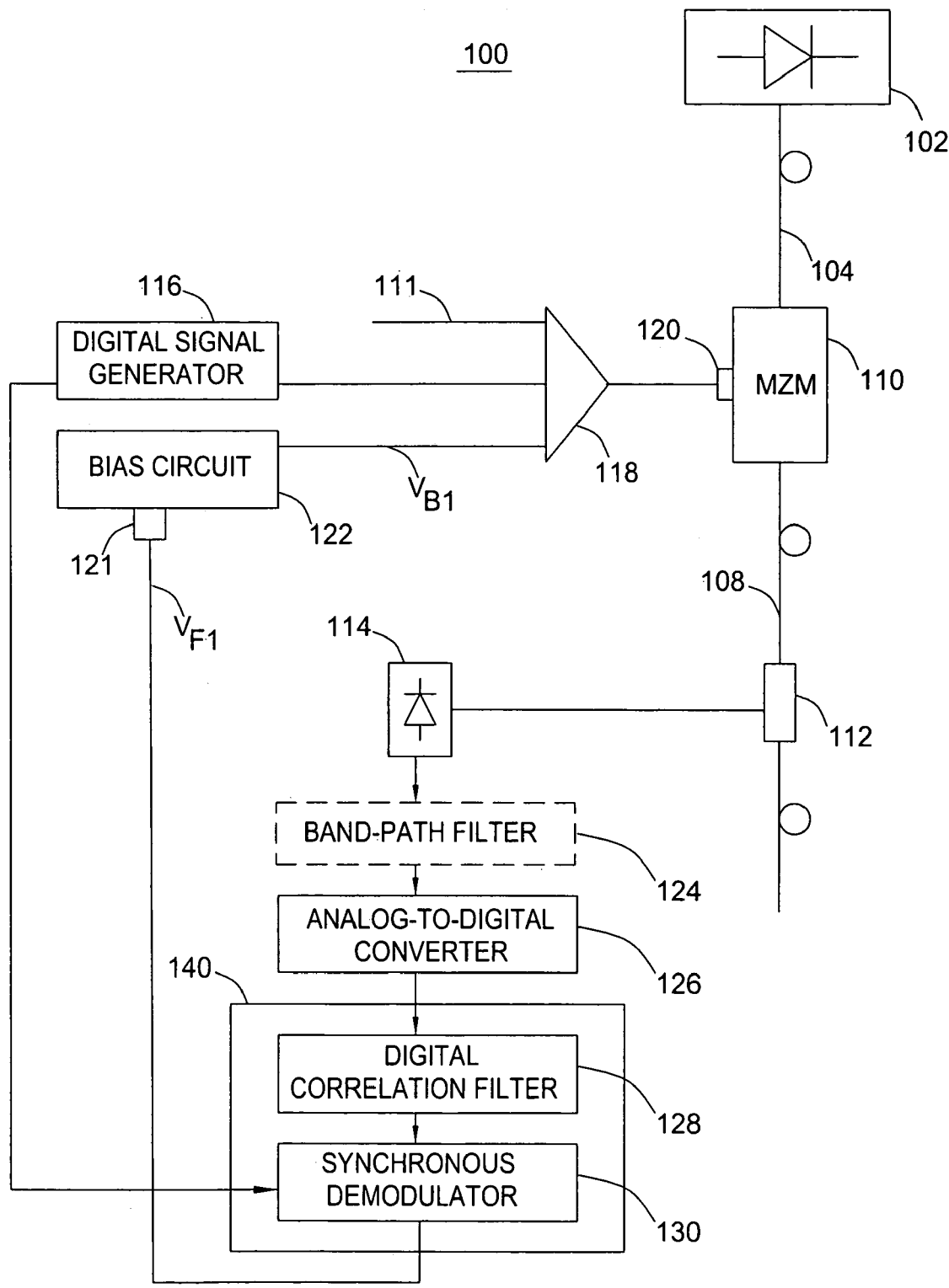
FIG. 1 depicts a block diagram of an apparatus for controlling a bias voltage of a MZM performing the NRZ modulation in accordance with one embodiment of the present invention.

FIG. 1 depicts a block diagram of a system 100 for controlling a bias voltage of a MZM performing the NRZ modulation in accordance with one embodiment of the present invention. The system 100 comprises a CW laser 102 (e.g., InGaAs/InP laser, and the like) coupled to a MZM 110 using a pigtail 104. An optical output of the MZM 110 is coupled, using a pigtail 108, to a coupler 112. The coupler 112 directs a small portion of an optical output to a photodetector (e.g., photodiode) 114, which output is coupled, through an optional analog band-path filter 124 and an analog-to-digital converter ADC 126, to a digital signal processor (DSP) 140.

A digital pilot tone is produced using a digital signal generator 116. The digital signal generator 116 comprises a digital to analog converter (DAC) that converts a digital signal into an analog domain. In one exemplary embodiment, the digital pilot tone is a digitized sinusoidal signal (e.g., about 1 to 2 kHz) comprising at least 2 digital components. Preferably, the digitized sinusoidal signal comprises about 20 or more digital components.

A controlled bias circuit 122 provides a DC bias voltage $V_{B1}$ to the MZM 110. A nominal value of the bias voltage $V_{B1}$ generally corresponds to the quadrature bias point the MZM 110. In one embodiment, the digital pilot tone and the bias voltage $V_{B1}$ are combined with an electrical data signal 111 (e.g., 10–40 Gbit/s) using a driver 118, which output is coupled to an electrical modulating input 120 of the MZM 110 (e.g., LiNbO$_3$ modulator, and the like electro-optic modulator). In alternate embodiments (not shown), the driver 118 may comprise an amplifier of the data signal 111, a modulator facilitating an amplitude modulation (AM) of the data signal 111 by the digital pilot signal, or other conventional means of coupling the data signal 111, digital pilot signal, and bias voltage $V_{B1}$. In yet another embodiment (also not shown), the MZM 110 and driver 118 may be integrated in a single module.

The photodiode 114 is a slow photodetector detecting the digital pilot signal and integrating a carrier signal of the laser 102 and an optical data signal. In operation, an output signal of the photodiode 114 generally comprises a sum of a smaller digital pilot signal embedded in larger noise component that may further comprise strong spurious components, as well as a DC component proportional to an average optical power at the output of the MZM 110.

The analog band-path filter 124 has a center frequency coinciding with or close to the frequency of the digital pilot signal and a bandwidth of about 20%. In one embodiment (not shown), the filter 124 further comprises an input analog amplifier or an output analog amplifier. The ADC 126 (e.g., 12 bit ADC) transforms an analog output signal at the output of the filter 124 in a digital format that may be processed by the DSP 140.

In one embodiment, the DSP 140 comprises a digital correlation filter 128 and a digital synchronous demodulator 130. In alternate embodiments (not shown), at least one of the digital correlation filter 128 and digital synchronous demodulator 130 are implemented in software (e.g., as a software program) in a computer processor of the DSP 140, a computer processor of the system 100, or a remote computer processor.

The digital correlation filter 128 is generally a real-time auto-correlation filter. Such a filter operates on the basic principle that small synchronous components (e.g., components of a digitized sinusoidal pilot signal) can be discriminated from larger asynchronous or noise components by summing and averaging multiple data points of an input signal (i.e., output signal of the ADC 126). In one embodiment, such data points include repetitive samples (i.e., measurements) of the digital components of the digitized sinusoidal pilot signal. When the summation is performed over a relatively large number of data points (e.g. at least 8 data points), asynchronous signals and noise average out to near zero, while a small synchronous signal of interest remains at its average level. The correlation filter 128 typically operates under the control of a microprocessor. Alternatively, the correlation filter may be implemented as a software program used by the DSP 140. An auto-correlation process generally comprises repetitive cycles each including a data acquisition step and data processing (i.e., averaging) step. Such data acquisition and data processing steps may be time multiplexed or performed simultaneously. In one embodiment, the digital correlation filter 128 recovers at least one of the digital pilot signal and a first harmonic of the digital pilot signal which is(are) outputted to the synchronous demodulator 130.

In the system 100, during a data acquisition cycle, the digital correlation filter 128 samples an output signal of the ADC 126. In one embodiment, a sampling rate of the filter 128 is about 20 kHz and the data acquisition cycle comprises 160 data points. The data points are temporarily stored, in a digital format, in a memory device of the correlation filter 128 and then are averaged. In this embodiment, at the input of the synchronous demodulator 130, a S/N ratio of the recovered (i.e., averaged) digital pilot tone signal and the first harmonic of such a signal is about 2 and, as such, 2 to 3 times greater than in conventional systems employing an analog pilot tone signal or an analog processing technique.

The synchronous demodulator 130 is generally a digital synchronous detector that is inputted with an recovered output digital signal from the digital correlation filter 128 and the digital pilot tone signal from the signal generator 116. Alternatively, the synchronous demodulator 130 may be implemented as a software program used by the DSP 140. The synchronous demodulator 130 demodulates, in a conventional manner, the output signal from the digital correlation filter 128 and produces a feedback signal $V_{F1}$. The feedback signal $V_{F1}$ comprises the information needed for adjusting an output voltage of the bias circuit 122 to the optimal (i.e., quadrature) bias point of the MZM 110. The feedback signal $V_{F1}$ is applied to a control input 121 of the bias circuit 122.

In one exemplary embodiment, the DSP 140 comprises the ADC 126 mod. AD7859 available from Analog Devices, Inc. of Norwood, Mass. and the digital correlation filter 128 that is implemented as a software program used in the processor mod. TMS320C6202 available from Texas Instruments, Inc. of Dallas, Tex.

In response to the feedback signal $V_{F1}$, the bias circuit 122 adjusts the output voltage $V_{B1}$ (i.e., bias voltage) that is provided, via the driver 118, to the MZM 110. In one embodiment, the bias circuit 122 may maintain such adjusted value of the bias voltage for a pre-determined time, e.g., a duration of the cycle comprising a data acquisition step and a data processing step of the digital correlation filter 128 or, alternatively, an integer multiple of a duration of such a cycle. In a further embodiment (not shown) the bias circuit 122 is implemented as a software program within the DSP 140 and a programmable DAC that generates the bias voltage.

In operation, the bias circuit 122 dynamically responds to the signal $V_{F1}$ and maintains the bias voltage $V_{B1}$ at the quadrature bias point of the MZM 110. In one illustrative embodiment, an amplitude and polarity of the feedback signal $V_{F1}$ define the value and polarity of the adjustment for the bias voltage $V_{B1}$, respectively. In an alternate embodiment (not shown), interface between the synchronous demodulator 130 and the bias circuit 122 may be facilitated using a digital link, such as RS-232 serial interface, and the like. In a further embodiment, the interface may be implemented, in a form of a software program, within the DSP 140 and/or the system 100.

In the system 100, a high S/N ratio of the recovered digital pilot tone signal results in high accuracy of the feedback signal $V_{F1}$ controlling the bias voltage $V_{B1}$, as well as in immunity of the feedback signal from the noise level and spurious noise components which might be present in the system.

Figure 2:
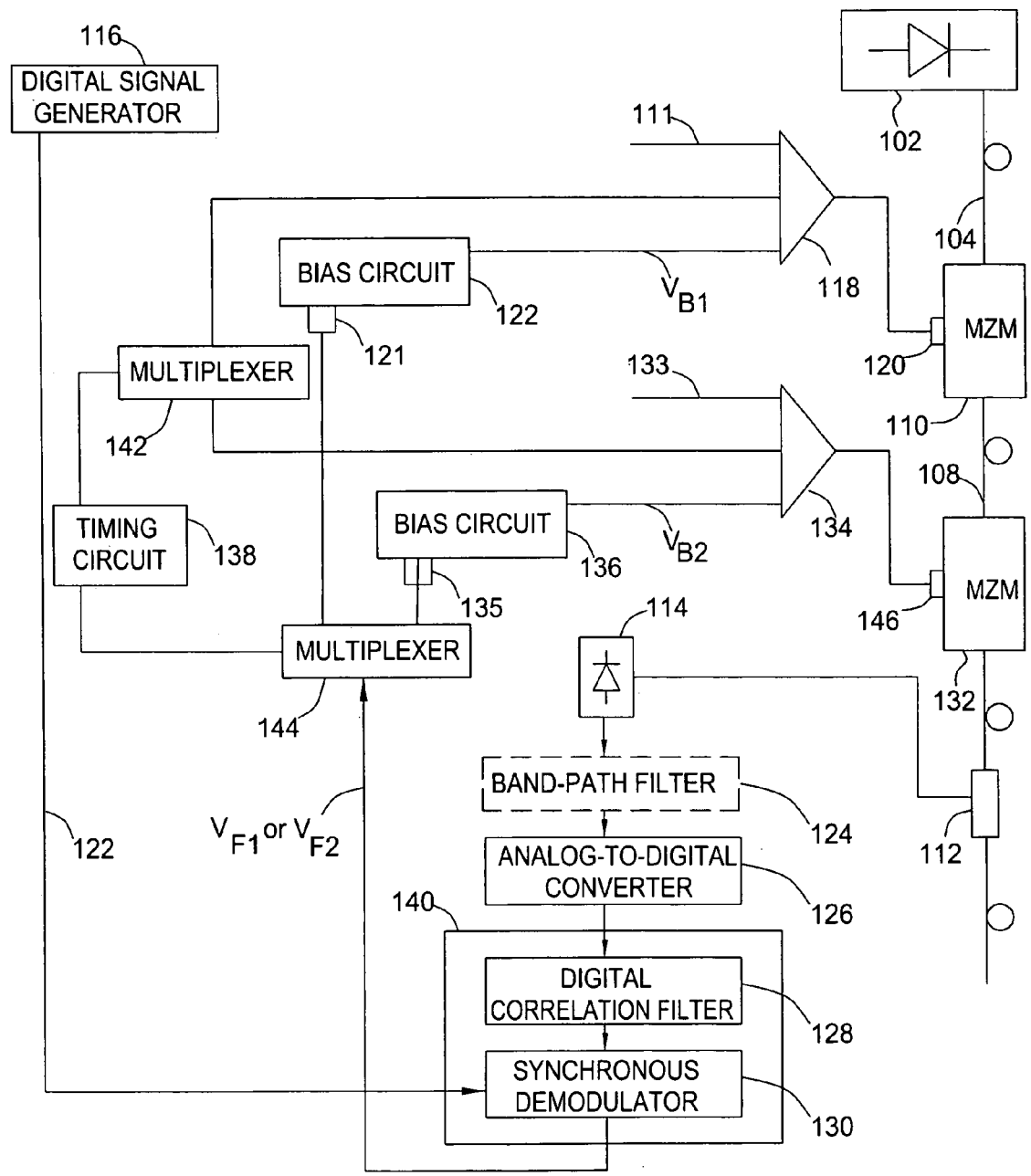
FIG. 2 depicts a block diagram of an apparatus for controlling a bias voltage of MZMs performing the RZ or CSRZ modulation in accordance with one embodiment of the present invention.

FIG. 2 depicts a block diagram of a system 200 for controlling a bias voltage of an input MZM and an output MZM which are coupled for performing a RZ modulation or, alternatively, a CSRZ modulation of an optical signal in accordance with one embodiment of the present invention. The system 200 comprises the CW laser 102 coupled to the MZM 110 (input MZM) using a pigtail 104. The MZM 110 is optically coupled to a MZM 132 (output MZM) using a pigtail 108. An optical output of the MZM 132 is coupled to the coupler 112. The coupler 112 directs a small portion of the optical output to the photodetector 114, which output is coupled to the DSP 140.

A modulating input 146 of the MZM 132 is electrically coupled to a driver 134 that combines an electrical data signal 133, the digital pilot tone, and a bias voltage $V_{B2}$ from a controlled bias circuit 136. In one exemplary embodiment, the drivers 118 and 134, as well as the bias circuits 122 and 136, may be configured and operate similarly. The data signals 111 and 133 are generally provided to the drivers 118 and 134 with a phase shift $\phi$. The phase shift $\phi$ may be controlled using, e.g., a phase-locked loop (PLL) circuit (not shown), either analog or digital. Connections to the digital signal generator 116 and control inputs of the bias circuits 122, 136 are administered by a timing circuit 138 using multiplexers 142 and 144, respectively.

Figure 3:
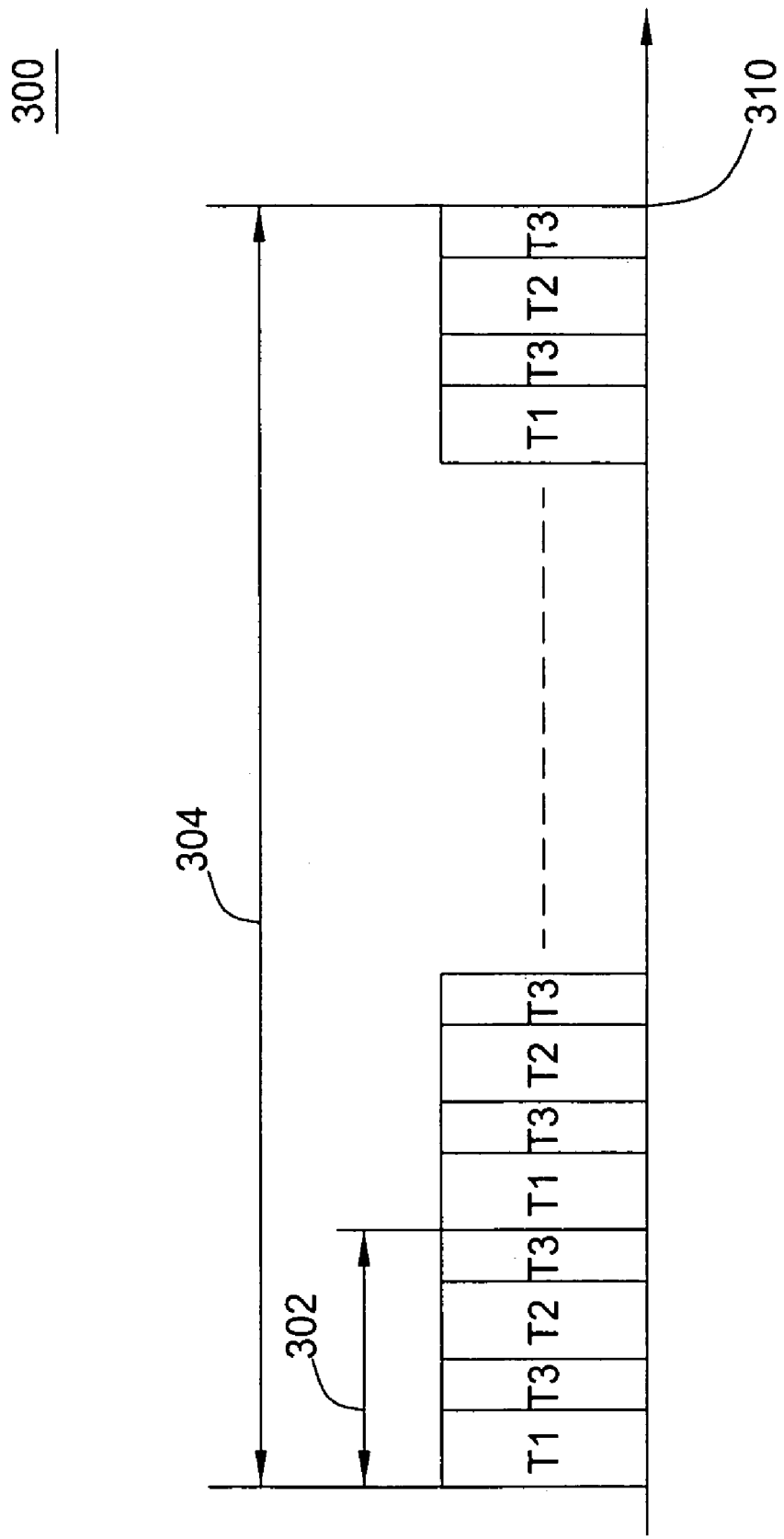
FIG. 3 depicts an exemplary timing diagram of time multiplexing the control and feedback signals in the apparatus of FIG. 2.

FIG. 3 depicts an exemplary timing diagram of time multiplexing the control and feedback signals in the system 200. Specifically, a graph 300 depicts a sequence of cycles 302 comprising time intervals T1 and T2 and an optional time interval T3 versus time (x-axis 310). Together, a plurality of the cycles 302 represents a duration of a period 304 of continuous operation of the system 200. In a further embodiment (not shown), to reduce interference between different control operations, at least in of the time intervals T1, T2, and T3 may comprise an optional period or periods of idle time.

Referring to FIG. 2, in one embodiment during a time interval T1, the output of the digital signal generator 116 is connected to the input of the driver 118 and the output of the synchronous demodulator 130 is connected to the control input 121 of the bias circuit 122. During a time interval T2, the output of the digital signal generator 116 is connected to the input of the driver 134 and the output of the synchronous demodulator 130 is connected to a control input 135 of the bias circuit 136. The time intervals T1 and T2 may be separated by an optional time interval T3. During the time interval T3, no connections are provided to the digital signal generator 116 and control inputs of the bias circuits 122, 136.

In operation, the timing circuit 138 facilitates time multiplexing of the connections to the digital signal generator 116, as well as to control inputs of the bias circuit 122 of the MZM 110 and the bias circuit 136 of the MZM 132. A duration of the time intervals T1 and T2 is selected to be an integer multiple of a duration of the cycle comprising a data acquisition step and a data processing step in the digital correlation filter 128.

During the time interval T1, the multiplexers 142 and 144 connect the output of the digital signal generator 116 to the input of the driver 118 (multiplexer 142) and the output of the synchronous demodulator 130 to the control input 121 of the bias circuit 122 (multiplexer 144). In response, the system 200 adjusts the bias voltage $V_{B1}$ to the quadrature bias point of the MZM 110, as discussed above in reference to the system 100 (FIG. 1). The bias circuit 122 may maintain such an adjusted value of the bias voltage for a duration that is at least equal or greater than a sum of the time intervals T1 and T3, i.e., till the updated feedback signal $V_{F1}$ is provided, during the consecutive time interval T1 of the period 304, by the DSP 140.

During the time interval T2, the multiplexers 142 and 144 connect the output of the digital signal generator 116 to the input of the driver 134 (multiplexer 142) and the output of the synchronous demodulator 130 to the control input 135 of the bias circuit 136 (multiplexer 144). During this time interval, the DSP 140 produces a feedback signal $V_{F2}$ that comprises the information needed for adjusting an output voltage of the bias circuit 136 to a pre-selected bias point (e.g., maximum, minimum, or quadrature bias point) of the MZM 132. The feedback signal $V_{F2}$ is applied to the control input 135 of the bias circuit 136. To produce the feedback signals $V_{F1}$ and $V_{F2}$, the DSP 140 may use the same or similar procedures and algorithms. In one exemplary embodiment, in the system 200 performing the RZ modulation, the synchronous demodulator 130 uses the recovered digital pilot signal and the first harmonic of the signal to produce the feedback signals $V_{F2}$ and $V_{F1}$, respectively.

In response to the feedback signal $V_{F2}$, the bias circuit 136 adjusts the bias voltage provided to the MZM 132 to the pre-selected bias point (e.g., maximum bias point) of the MZM. The bias circuit 136 may maintain such an adjusted value of the bias voltage for a duration that is at least equal or greater than a sum of the time intervals T2 and T3, i.e., till the updated feedback signal $V_{F2}$ is provided, during the consecutive time interval T2 of the period 304, by the DSP 140. As such, using the time multiplexing technique, the system 200 provides dynamic control of the optimal bias points of the MZM 110 and MZM 132 using a single digital pilot tone.

In the system 200, a high S/N ratio of the recovered digital pilot tone signal results in high accuracy of the feedback signals $V_{F1}$ and $V_{F2}$ controlling the bias voltages $V_{B1}$ and $V_{B2}$, respectively, and facilitates immunity of the feedback signals from the noise level and spurious noise components which might be present in the system.

Figure 4A:
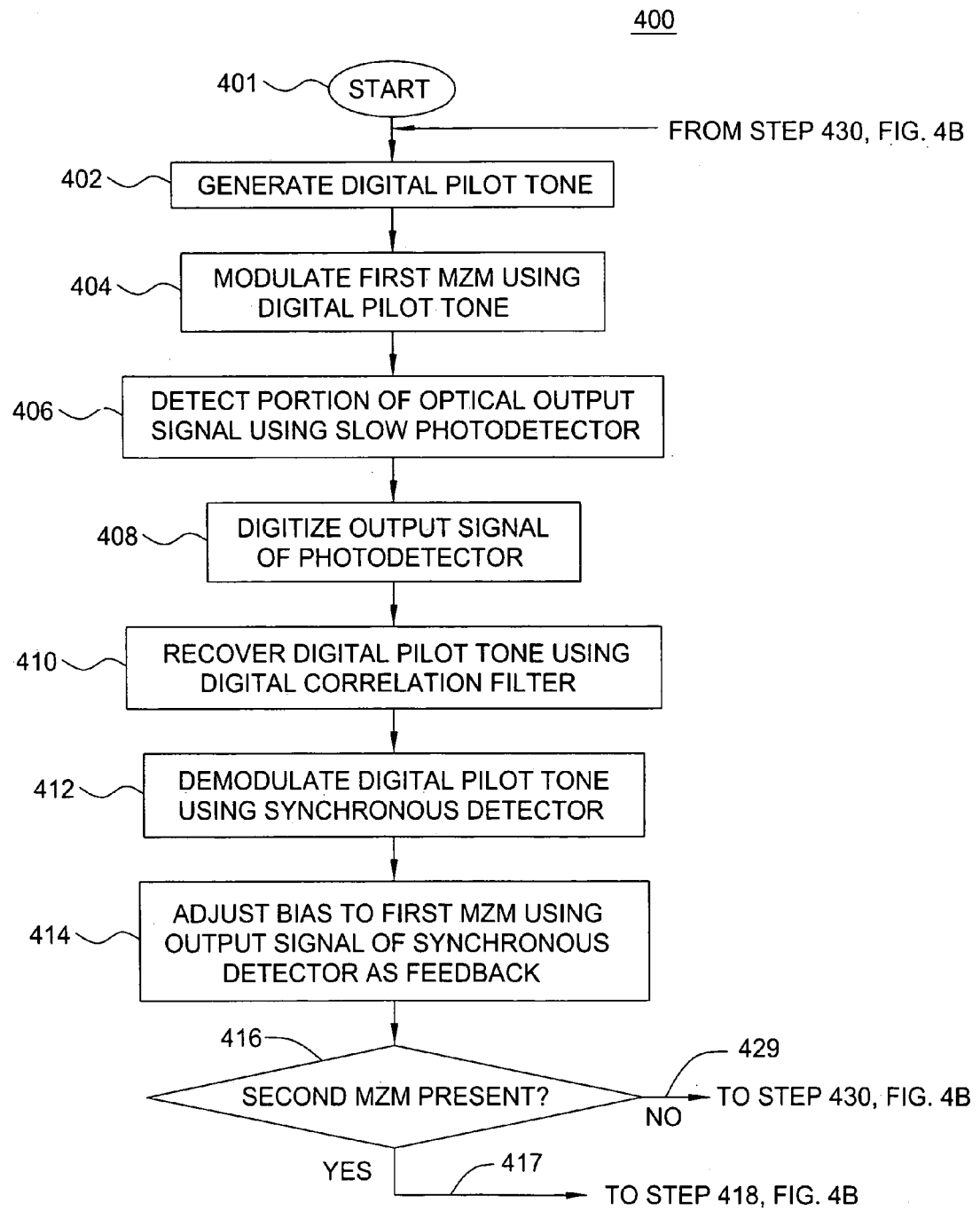
FIGS. 4A–4B, together, depict a flow diagram of one embodiment of the inventive method of controlling a bias voltage of the MZM(s) performing high-speed modulation of an optical signal.
Figure 4B:
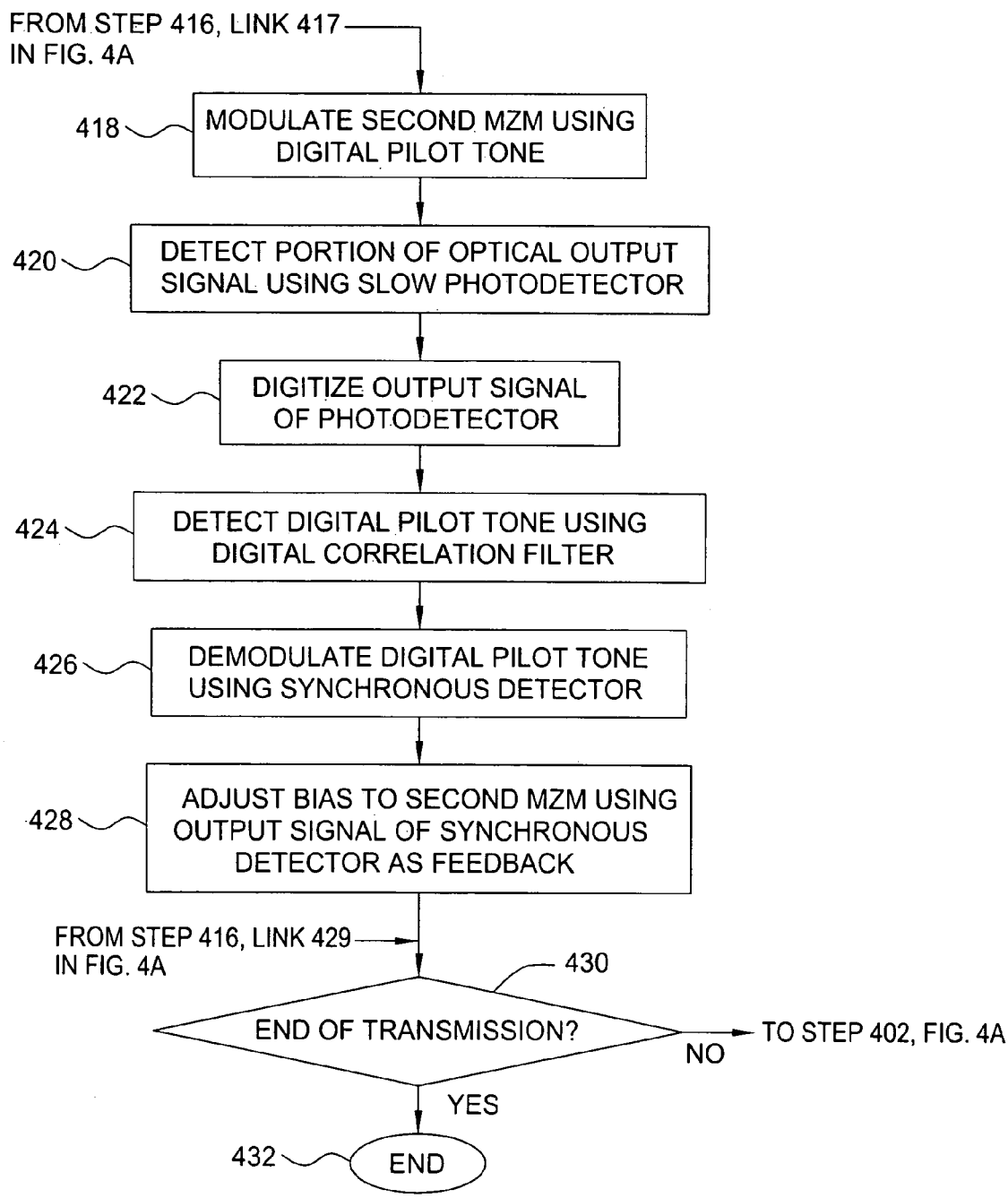

FIGS. 4A–4B, together, depict a flow diagram of one embodiment of the inventive method for controlling a bias voltage of MZM modulators used in high-speed optical communications as a process 400. To best understand the invention, the reader should simultaneously refer to FIGS. 1–2 and 4A–4B.

The process 400 starts at step 401 and proceeds to step 402, where a digital pilot tone is generated. At step 404, the digital pilot tone is used to modulate a first MZM. At step 406, a small portion of an optical output signal is detected using a slow photodetector. At step 408, an output signal of the photodetector is optionally filtered using a band-path filter (not shown) and then digitized using an ADC. At step 410, a digital correlation filter is used to recover the digital pilot tone. At step 412, a synchronous demodulator demodulates the digital pilot tone and produces a feedback signal for a bias circuit of the first MZM. At step 414, the bias circuit of the first MZM adjusts the bias voltage to the quadrature bias point.

At step 416, the process 400 queries if there is another MZM (i.e., second MZM) in the optical path. Specifically, the second MZM may be present in a system using the RZ or CSRZ modulation, while the system using the NRZ modulation generally comprises only the first MZM. If the query of step 416 is negatively answered (shown using a link 429), the process 400 proceeds to step 430. If the query of step 416 is affirmatively answered (shown using a link 417), the process 400 proceeds to step 418. At step 418, the digital pilot tone is used to modulate the second MZM. Steps 420, 422, 424, 426, and 428 are similar to the respective steps 406, 408, 410, 412, and 414, however, are performed in reference to the second MZM.

At step 430, the process 400 queries if the optical transmission has been competed. If the query of step 430 is negatively answered, the process 400 proceeds to step 402 to continue controlling the bias voltage of the MZM modulators, as discussed above. If the query of step 416 is affirmatively answered, the process 400 proceeds to step 432, where the process 400 ends.

While the foregoing is directed to the illustrative embodiment of the present invention, other and further embodiments of the invention may be devised without departing from the basic scope thereof, and the scope thereof is determined by the claims that follow.

What is claimed is:

1. A method of controlling a bias voltage of a Mach-Zender modulator (MZM) performing a non-return-to-zero (NRZ) modulation of an optical signal, comprising:
    generating a digital pilot signal;
    modulating the MZM using the digital pilot signal;
    coupling a portion of an optical output signal from the MZM to a light detector;
    processing an output signal of the light detector using a digital correlation filter to recover the digital pilot signal; and
    demodulating the recovered digital pilot signal to produce a feedback signal controlling the bias voltage of the MZM.

2. The method of claim 1 wherein the digital pilot signal is a digitized sinusoidal signal.

3. The method of claim 1 wherein the processing step further comprises:
    filtering the output signal of the light detector using a band-path filter
    digitizing the output signal of the light detector using an analog-to-digital converter;
    sampling the output signal of the analog-to-digital converter; and
    applying a digital correlating technique recover at least one of the digital pilot signal or a first harmonic of the digital pilot signal.

4. The method of claim 3 wherein the digital correlating technique further comprises:
    time-domain averaging of a pre-determined number of samples of the output signal of the analog-to-digital converter.

5. The method of claim 1 wherein the demodulating step further comprises:
    using a digital synchronous demodulating technique, and generating a signal while maintaining a bias voltage of the MZM at a quadrature bias point.

6. A method of controlling bias voltages of an input Mach-Zender modulator (MZM) and an output MZM coupled for performing a return-to-zero (RZ) modulation or a carrier suppressed RZ (CSRZ) modulation of an optical signal, comprising:
    generating a digital pilot signal;
    modulating sequentially the input MZM or the output MZM using the digital pilot signal;
    coupling a portion of an optical output signal from the output MZM to a light detector;
    processing an output signal of the light detector using a digital correlation filter to recover the digital pilot signal; and
    demodulating the detected digital pilot signal to produce a feedback signal controlling a bias voltage of an MZM modulated using the digital pilot signal during at least a data sampling period of the processing step.

7. The method of claim 6 wherein the digital pilot signal is a digitized sinusoidal signal.

8. The method of claim 6 wherein the processing step further comprises:
    filtering the output signal of the light detector using a band-path filter
    digitizing the output signal of the light detector using an analog-to-digital converter;
    sampling the output signal of the analog-to-digital converter; and
    applying a digital correlating technique recover at least one of the digital pilot signal or a first harmonic of the digital pilot signal.

9. The method of claim 8 wherein the digital correlating technique further comprises:
    time-domain averaging of a pre-determined number of samples of the output signal of the analog-to-digital converter.

10. The method of claim 6 wherein the demodulating step further comprises:
    using a digital synchronous demodulating technique, and generating a signal while maintaining a bias voltage of the MZM at a quadrature bias point.

* * * * *